United States Patent
Lehrer et al.

(10) Patent No.: US 11,229,860 B2
(45) Date of Patent: Jan. 25, 2022

(54) APPLICATION OF FORMALDEHYDE SULFOXYLATES FOR SCAVENGING $H_2S$

(71) Applicant: Baker Hughes, a GE company, LLC, Houston, TX (US)

(72) Inventors: Scott E. Lehrer, The Woodlands, TX (US); Soma Chakraborty, Houston, TX (US); Sunder Ramachandran, Sugar Land, TX (US); Kimchi T. Phan, Katy, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 0 days.

(21) Appl. No.: 17/124,676

(22) Filed: Dec. 17, 2020

(65) Prior Publication Data

US 2021/0101095 A1    Apr. 8, 2021

Related U.S. Application Data

(62) Division of application No. 16/031,876, filed on Jul. 10, 2018, now Pat. No. 10,940,407.

(60) Provisional application No. 62/531,686, filed on Jul. 12, 2017.

(51) Int. Cl.
| | |
|---|---|
| *B01D 19/00* | (2006.01) |
| *C10G 29/28* | (2006.01) |
| *C02F 1/20* | (2006.01) |
| *B01D 17/04* | (2006.01) |
| *C02F 101/10* | (2006.01) |

(52) U.S. Cl.
CPC ....... *B01D 19/0005* (2013.01); *B01D 17/047* (2013.01); *C02F 1/20* (2013.01); *C10G 29/28* (2013.01); *B01D 2257/304* (2013.01); *C02F 2101/101* (2013.01); *C10G 2300/202* (2013.01)

(58) Field of Classification Search
CPC .............. B01D 2257/304; B01D 53/52; B01D 17/047; B01D 19/0005; B01D 2251/80; B01D 53/1493; B01D 2251/70; B01D 2252/205; B01D 2257/306; B01D 2258/06; B01D 53/1462; B01D 53/1468; C10L 2290/545; C10L 3/103
See application file for complete search history.

(56) References Cited

U.S. PATENT DOCUMENTS

| | | |
|---|---|---|
| 3,490,480 A | 1/1970 | Parsons |
| 4,405,412 A | 9/1983 | Nardelli |

(Continued)

FOREIGN PATENT DOCUMENTS

| | | |
|---|---|---|
| WO | 199601046 | 1/1996 |
| WO | 2016155967 A1 | 10/2016 |

*Primary Examiner* — Sharon Pregler
(74) *Attorney, Agent, or Firm* — Mossman, Kumar & Tyler, P.C.

(57) ABSTRACT

A scavenger comprising a formaldehyde sulfoxylate may be used to scavenge hydrogen sulfide ($H_2S$) from systems that are brine or mixed production. Suitable formaldehyde sulfoxylates include, but are not necessarily limited to, sodium formaldehyde sulfoxylate, zinc formaldehyde sulfoxylate, and calcium formaldehyde sulfoxylate, potassium formaldehyde sulfoxylate, magnesium formaldehyde sulfoxylate, iron formaldehyde sulfoxylate, copper formaldehyde sulfoxylate, alkene aldehyde sulfoxylates, and combinations thereof.

14 Claims, 2 Drawing Sheets

(56) References Cited

U.S. PATENT DOCUMENTS

| | | | |
|---|---|---|---|
| 4,680,127 A * | 7/1987 | Edmondson | B01D 53/52 |
| | | | 210/749 |
| 5,037,483 A | 8/1991 | Dubin | |
| 5,660,736 A | 8/1997 | Bizot et al. | |
| 7,097,773 B1 | 8/2006 | Furlough et al. | |
| 9,480,946 B2 | 11/2016 | Ramachandran et al. | |
| 2005/0115895 A1 | 6/2005 | Simpson et al. | |
| 2006/0217584 A1 | 9/2006 | Nunez et al. | |
| 2010/0288125 A1 | 11/2010 | Vorberg et al. | |
| 2013/0004393 A1 | 1/2013 | Menendez et al. | |
| 2013/0123149 A1 | 5/2013 | Berkland et al. | |
| 2019/0015763 A1 * | 1/2019 | Lehrer | B01D 17/047 |
| 2019/0367799 A1 | 12/2019 | Gupta et al. | |

\* cited by examiner

APPLICATION OF FORMALDEHYDE SULFOXYLATES FOR SCAVENGING H₂S

CROSS-REFERENCE TO RELATED APPLICATIONS

This application is a divisional application from U.S. Ser. No. 16/031,876 filed Jul. 10, 2018, issued as U.S. Pat. No. 10,940,407 on Mar. 9, 2021, which in turn claimed the benefit of U.S. Provisional Patent Application No. 62/531,686 filed Jul. 12, 2017, both of which are incorporated herein by reference in their entireties.

TECHNICAL FIELD

The present invention relates to methods and compositions for scavenging contaminants from hydrocarbon and/or aqueous streams, including or without a gas phase, and more particularly relates, in one non-limiting embodiment, to methods and compositions for scavenging hydrogen sulfide ($H_2S$) from systems comprising mixed production systems or brine.

BACKGROUND

In the drilling, completions, production, transport, storage, and processing of crude oil and natural gas, including waste water associated with crude oil and gas production, and in the storage of residual fuel oil, contaminants are often encountered. Such contaminants may include, but are not necessarily limited to, hydrogen sulfide ($H_2S$), mercaptans, and/or sulfides. The presence of $H_2S$ and mercaptans is extremely objectionable because they are an acute health hazard and often highly corrosive. Still another reason that mercaptans are undesirable is that they have highly noxious odors. The fact that odors resulting from mercaptans are detectable by the human nose at comparatively low concentrations is well known. For example, mercaptans are used to odorize natural gas so that it may be readily detected and is used as a repellant by skunks and other animals.

Further, either of these contaminants in brine, hydrocarbon gas and/or mixed production systems may cause various health, safety and environmental (HSE) concerns and/or corrosion issues during the production, storage, transportation and processing of oil and gas, and in the handling of brine.

To eliminate these contaminants and potentially harmful species, scavenger systems have been developed in the art. However, many of these systems have limitations, including, but not necessarily limited to, low reactivity and therefore low efficiency, containing atypical components or elements that may adversely affect fuel or fluid quality, or may present toxicity concerns themselves and/or as the consequent reaction products.

It should be understood that nearly all scavenging systems for removing $H_2S$, mercaptans and/or sulfides from oil-based systems such as crude oil, oil slurries, asphalt, and the like, cannot be assumed to work in mixed production systems or dry and/or wet hydrocarbon gas systems. "Mixed production systems" are defined herein to be predominantly water with some oil present, where the water is greater than about 50 wt % of the mixture, alternatively greater than about 60 wt % of the mixture, in another non-limiting embodiment greater than about 70 wt % of the mixture, in another non-restrictive version greater than about 80 wt % of the mixture, and still another alternative at least about 90 wt % of the mixture. In one non-limiting embodiment the amount of oil in a "mixed production system" may be up to about 10 wt %. A mixed production system may contain a hydrocarbon gas, such as natural gas. As defined herein "hydrocarbon" refers to naturally occurring hydrocarbons recovered from subterranean formations which are not necessarily limited to molecules having only hydrogen and carbon and which may include heteroatoms including, but not necessarily limited to oxygen, nitrogen, and sulfur.

Many conventional $H_2S$ scavengers such as triazine work poorly in mixed production systems where the water content is above 20%. In addition to low effectiveness of these scavengers in mixed production systems the scaling and/or solid formation issues are often encountered.

Acrolein is the one well-known scavenger that is effective at scavenging $H_2S$, mercaptans and/or sulfides from oil-based systems as well as from a mixed production system, but acrolein is also well known to be very hazardous to handle and work with.

U.S. Pat. No. 9,480,946 discloses that transition metal carboxylate scavengers may be used to scavenge contaminants from systems that are mixed production and/or gas, either dry or wet hydrocarbon gas. The contaminants scavenged may include, but are not necessarily limited to, $H_2S$, mercaptans, sulfides, and combinations thereof. Suitable transition metal carboxylates in the scavenger include, but are not limited to, zinc octoate, zinc dodecanoate, zinc naphthenate, and combinations thereof.

It would be desirable if new methods and/or compositions could be devised that would reduce, eliminate, take out or otherwise remove $H_2S$ from these mixed production or aqueous or brine systems, as well as reduce, alleviate or eliminate corrosion caused by $H_2S$.

SUMMARY

There is provided a method for at least partially scavenging $H_2S$ from a system that is selected from the group consisting of mixed production and water, which system comprises $H_2S$, where the method includes contacting the system with a scavenger comprising a formaldehyde sulfoxylate in an effective amount to at least partially scavenge $H_2S$ from the system, and at least partially scavenging the $H_2S$ from the system.

There is additionally provided in another non-limiting embodiment a system treated for $H_2S$ where the system is selected from the group consisting of mixed production and brine, and comprises $H_2S$, and where the system comprises a scavenger comprising a formaldehyde sulfoxylate in an effective amount to at least partially scavenge $H_2S$ from the system.

DETAILED DESCRIPTION

Figure 1:
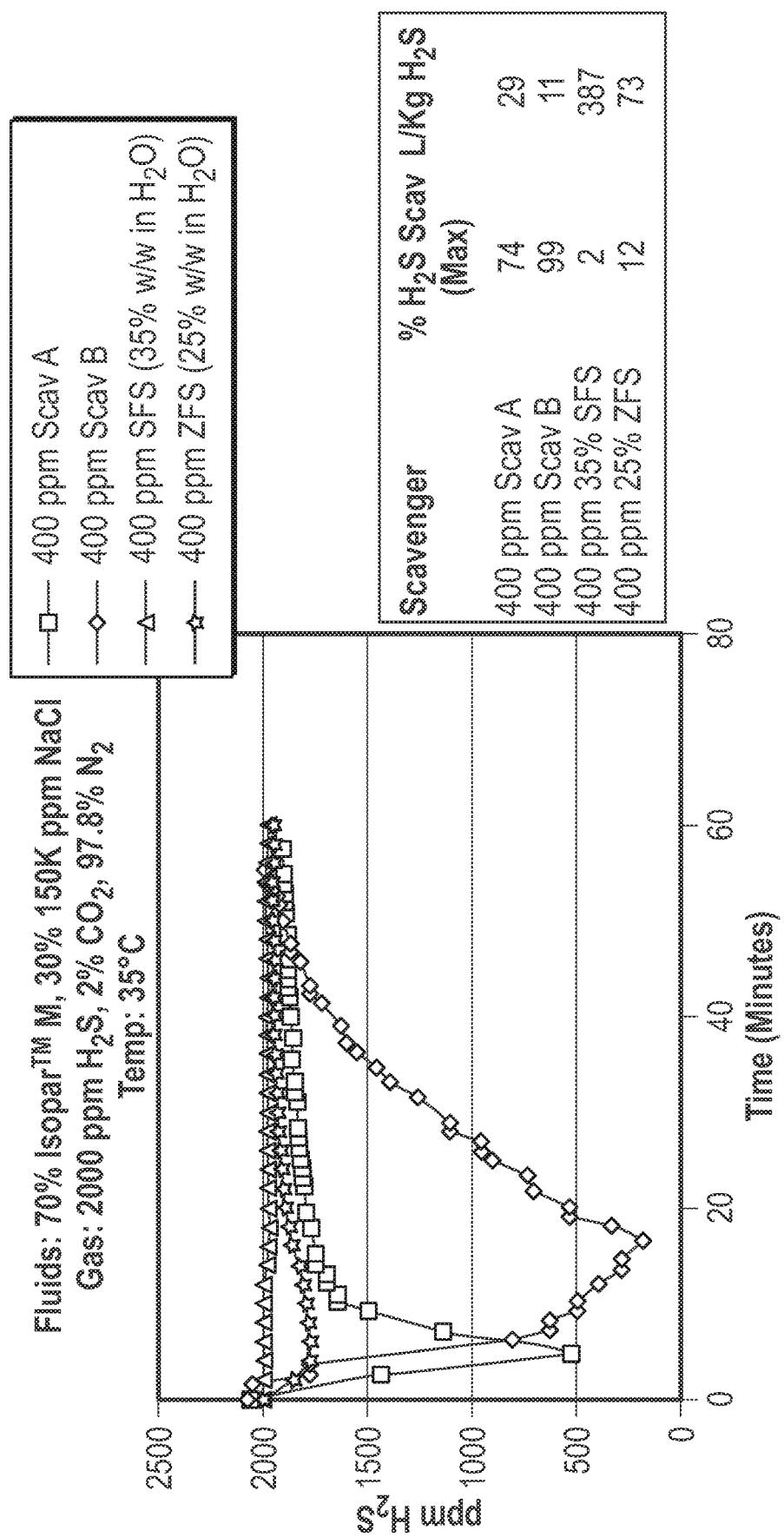
FIG. 1 is a graph demonstrating the change in $H_2S$ concentration vs. time with the injection of 400 ppm conventional Scavenger A, conventional Scavenger B, sodium formaldehyde sulfoxylate (SFS), and zinc formaldehyde sulfoxylate (ZFS) in a simulated mixed production system at 35° C.

It has been discovered that formaldehyde sulfoxylates react with or "scavenge" or otherwise remove $H_2S$ from systems comprising water or brine, or from mixed production systems. Hydrogen sulfide may over time and/or under certain conditions contact other reactants and form undesirable corrosive products.

Formaldehyde sulfoxylates are commonly available as either the sodium or zinc salt, and also available as the calcium salt. Other formaldehyde sulfoxylates include, but are not necessarily limited to, potassium formaldehyde sulfoxylate, magnesium formaldehyde sulfoxylate, iron formaldehyde sulfoxylate, copper formaldehyde sulfoxylate, alkene aldehyde sulfoxylates, and the like. Sodium formaldehyde sulfoxylate (SFS) is also known as sodium hydroxymethylsulfinate and is available both as the anhydrous salt (CAS #149-44-0) and as the dihydrate (CAS #6035-47-8). Sodium formaldehyde sulfoxylate is widely used in the dye industry as well as applications in other industries and functions as a reducing agent, antioxidant, oxygen scavenger. The zinc formaldehyde sulfoxylate (ZFS) (CAS #24887-06-7) has applications in the textile industry. Alkene aldehyde sulfonates are known to be used as nematocides, insecticides, and fungicides as disclosed in WO 1996/001046 A1.

Neither SFS nor ZFS appears to have been used in the oil industry at all, much less as $H_2S$ scavengers. The hydroxymethanesulfinate ion is unstable in solution towards decomposition to formaldehyde and sulfite although the conditions and extent of this release are not known. In one non-limiting explanation of the mechanism it may be that that either SFS or ZFS could function as a formaldehyde delivery agent. In a different, non-restrictive explanation, the ZFS is thought to have potentially dual functionality as both a source of formaldehyde and a source of zinc to react with $H_2S$.

As defined herein, a hydrocarbon gas includes, but is not necessarily limited to, natural gas, further including, but not limited to methane, ethane and include higher molecular weight fractions and gas condensate. The term "hydrocarbon gas" is not limited to chemical compounds having only hydrogen and carbon atoms, but may include chemicals customarily referred to as "hydrocarbons" including, but not necessarily limited to, petroleum, crude oil, natural gas, asphaltenes, constituent parts thereof and the like. Some of the molecules may contain heteroatoms such as oxygen, nitrogen and sulfur.

In one non-limiting instance, contaminants such as $H_2S$, mercaptans, and sulfides are frequently present in many oilfield and refinery systems that comprise water and/or a hydrocarbon gas. Efforts to minimize or exclude the $H_2S$ from such water-containing hydrocarbon gas systems and streams, particularly when water is a predominant part thereof, are often ineffective or economically infeasible. Consequently, there is a need for another method of removing these contaminants from the systems or mixtures containing water or mixed production systems and other such streams for health and environmental concern. Surprisingly, the formaldehyde sulfoxylate scavengers and method described herein is one such approach. It will be appreciated that in the context herein, the term "scavenger" encompasses one or more components or additives, whether added to a stream separately or together, that scavenge at least $H_2S$, but which may scavenge other of the contaminants noted. It has also been surprisingly found that in these instances, the reaction products and/or solids, if formed, are well dispersed in the water phase and easy to handle.

Scavenger chemistry described herein has been discovered to react with and "remove" these contaminants, that is, they form less-objectionable reaction products which may still remain in the stream but do not have the undesirable effects of the contaminant per se. For instance, the action of the formaldehyde sulfoxylate scavenger on the contaminants effectively at least partially (or completely) converts them into thermally stable higher molecular weight compounds.

It has been discovered that formaldehyde sulfoxylate carboxylates are effective in reacting with these contaminants to produce compounds or products that will no longer cause difficulty or concerns, or at least are less objectionable than the contaminants per se. It should be understood that the process is not technically "removing" the contaminant. By "removing", the contaminant is converted into a product that will prevent it from presenting more concerns and problems than the original contaminant. The reaction between the transition metal carboxylate scavenger and the contaminant will form a thermally stable product that does not cause or present such serious concerns or problems.

In one non-limiting embodiment, the formaldehyde sulfoxylate scavenger may include, but is not necessarily limited to, sodium formaldehyde sulfoxylate (SFS), zinc formaldehyde sulfoxylate (ZFS), calcium formaldehyde sulfoxylate, potassium formaldehyde sulfoxylate, magnesium formaldehyde sulfoxylate, iron formaldehyde sulfoxylate, copper formaldehyde sulfoxylate, alkene aldehyde sulfoxylates, and the like, and combinations thereof.

It has been discovered that the formaldehyde sulfoxylate perform as $H_2S$ scavengers relatively quickly in water or brine, but perform relatively more slowly in mixed production systems, where the slowing of the scavenging is proportional to the increase in hydrocarbon or oil in the mixed production system. As noted, "mixed production" is a broad term which could include a wide range of oil/water ratios. Since the formaldehyde sulfoxylates work well in water or brine, and show relatively poorer results in oil, the results are in between for 70/30 oil/water, for example. The data indicate that both a higher water cut mixed production system and longer residence time would both increase the efficiency of the formaldehyde sulfoxylates as $H_2S$ scavengers. One non-limiting concept of the formaldehyde sulfoxylates is that they scavenge $H_2S$ by a formaldehyde release mechanism. In the case of the zinc formaldehyde sulfoxylate, the ZFS also appears to scavenge by providing a source of zinc. However like in the case of oil (simulated by ISOPAR™ M in the Examples herein), it appears that only the zinc reaction with $H_2S$ may be occurring and that using zinc formaldehyde sulfoxylate as only a source of zinc may not be cost effective.

Nevertheless, for aqueous fluids including, but not necessarily limited to brine, one residence time range is from at least about one hour and higher; and an alternative residence time range would be at least about 2 hours and higher, and in another non-restrictive version at least about 4 hours. There is no particular need for a maximum time, but in one non-limiting embodiment a maximum could be 10 hours or 12 hours.

For mixed production applications, in one non-limiting embodiment the residence time may range from at least 4 hours and higher; in another version at least 8 hours and higher, and alternatively at least 10 hours and higher. There is no particular need for a maximum time, but about 36 hours could be a maximum in one non-limiting embodiment.

The proportion of formaldehyde sulfoxylate used to scavenge $H_2S$ in the system can be based on the amount of $H_2S$ to be scavenged rather than a ppm dosage of formaldehyde sulfoxylate. In the case of sodium formaldehyde sulfoxylate (SFS), the minimum dosage that would be required if all of the formaldehyde was released from the scavenger would be 3.7 kg/kg $H_2S$. In the case of zinc formaldehyde sulfoxylate (ZFS), the minimum dosage assuming all the formaldehyde is released plus including the reaction of zinc with $H_2S$ to form zinc sulfide is 2.7 kg/kg $H_2S$. These would be the minimums required whether the system was mixed fluid or brine based, on the theoretical efficiencies. Nevertheless, in one non-limiting embodiment an effective amount of the formaldehyde sulfoxylate scavenger ranges from about 2.5 kg/kg $H_2S$ independently to about 50 kg/kg $H_2S$; in another non-limiting embodiment from about 3 kg/kg $H_2S$ independently to about 20 kg/kg $H_2S$; alternatively from about 4 kg/kg $H_2S$ independently to about 10 kg/kg $H_2S$. The use of the term "independently" with respect to a range herein means that any lower threshold and any upper threshold may be combined to give an acceptable alternative range for that parameter.

The formaldehyde sulfoxylates are water based and thus water may be used as a solvent. The maximum amount of sodium formaldehyde sulfoxylate that is soluble in water is about 600 g/liter. The minimum amount which is probably practical is about 100 g/liter. For zinc formaldehyde sulfoxylate, the maximum amount would be about 500 g/liter with a lowest practical amount of about 100 g/liter. It would also be possible to apply the formaldehyde sulfoxylates as solids and these materials are available in solid form.

In the scavenging method there should be sufficient time and temperature for the desired reaction to occur. The method can be practiced in a temperature range between about 32° F. and about 300° F. (about 0° C. to about 149° C.); alternatively up to about 200° F. (about 93° C.). In any event, sufficient time and/or conditions should be permitted so that the formaldehyde sulfoxylate scavenger reacts with substantially all of the contaminant present. By "substantially all" is meant that no significant corrosion, odor and/or reactant problems occur due to the presence of the contaminant(s).

It will be understood that the complete elimination of corrosion, odor or other problems or complete removal of the $H_2S$ is not required for successful practice of the method. All that is necessary for the method to be considered successful is for the treated brine or mixed production system or stream to have reduced amounts of $H_2S$ as compared to an otherwise identical brine or mixed production system having no formaldehyde sulfoxylate scavenger, and/or a reduced corrosion capability as compared to an otherwise identical brine or predominantly mixed production system or stream having an absence of the formaldehyde sulfoxylate scavenger. Of course, complete removal of $H_2S$ is an acceptable result.

It is expected that the scavenging method described herein would be applicable in a variety of applications including, but not necessarily limited to, downhole applications, e.g. oil and gas wells where the fluids in these wells has at least a partial aqueous or brine phase; mixed phase pipelines; transport of sour water for disposal; frac-water systems; acid flow back wells; sour water strippers; and wastewater systems. By "mixed phase" is meant a mixture of a water phase and an oil phase.

The invention will now be described with respect to particular Examples that are not intended to limit the invention but simply to illustrate it further in various non-limiting embodiments. Unless otherwise noted, all percentages (%) are weight %, and all dosages are ppm by volume.

Examples 1-54

The formaldehyde sulfoxylates SFS and ZFS were evaluated in a modified ASTM D5705 "Standard Test Method for the Evaluation of Hydrogen Sulfide in the Vapor Phase Above Residual Fuel Oils" as well as in a proprietary Continuous Gas Flow $H_2S$ scavenger test. The later test is particularly suited to the evaluation of scavengers in applications with short residence times (seconds to minutes) and is described in U.S. Pat. No. 9,480,946 to Baker Hughes Incorporated, which is incorporated herein by reference in its entirety. The majority of testing was done with the modified ASTM D5705 test. The results for the modified ASTM D5705 are presented in Table I below, and the results for the Continuous Gas Flow tests are presented in FIGS. 1 and 2.

All of the testing by the modified ASTM D5705 method was performed in a Shaking Hot Tub. Testing was at 120° F. (49° C.) and at an orbital shaking rate of 60 rpm. The test vessels were 500 ml Boston Round bottles with a liquid vol. of 250 ml. $H_2S$ in the vapor phase was measured with Drager Gas Detection Tubes. For most of the baseline (untreated) $H_2S$ measurements, Drager tubes with a range of 2,000-70,000 ppm $H_2S$ were used. For treated tests, most $H_2S$ measurements were with Drager tubes with a range of 100-2000 ppm. The top of the tube is approximately 2500 ppm $H_2S$ so if the $H_2S$ level went above the top of the tube it was said to be ">2500 ppm". Both SFS and ZFS are solids, so SFS was tested as a 35% w/w solution in deionized water (DI $H_2O$) while the ZFS was tested in a 25% w/w hazy sol. in DI $H_2O$.

Figure 2:
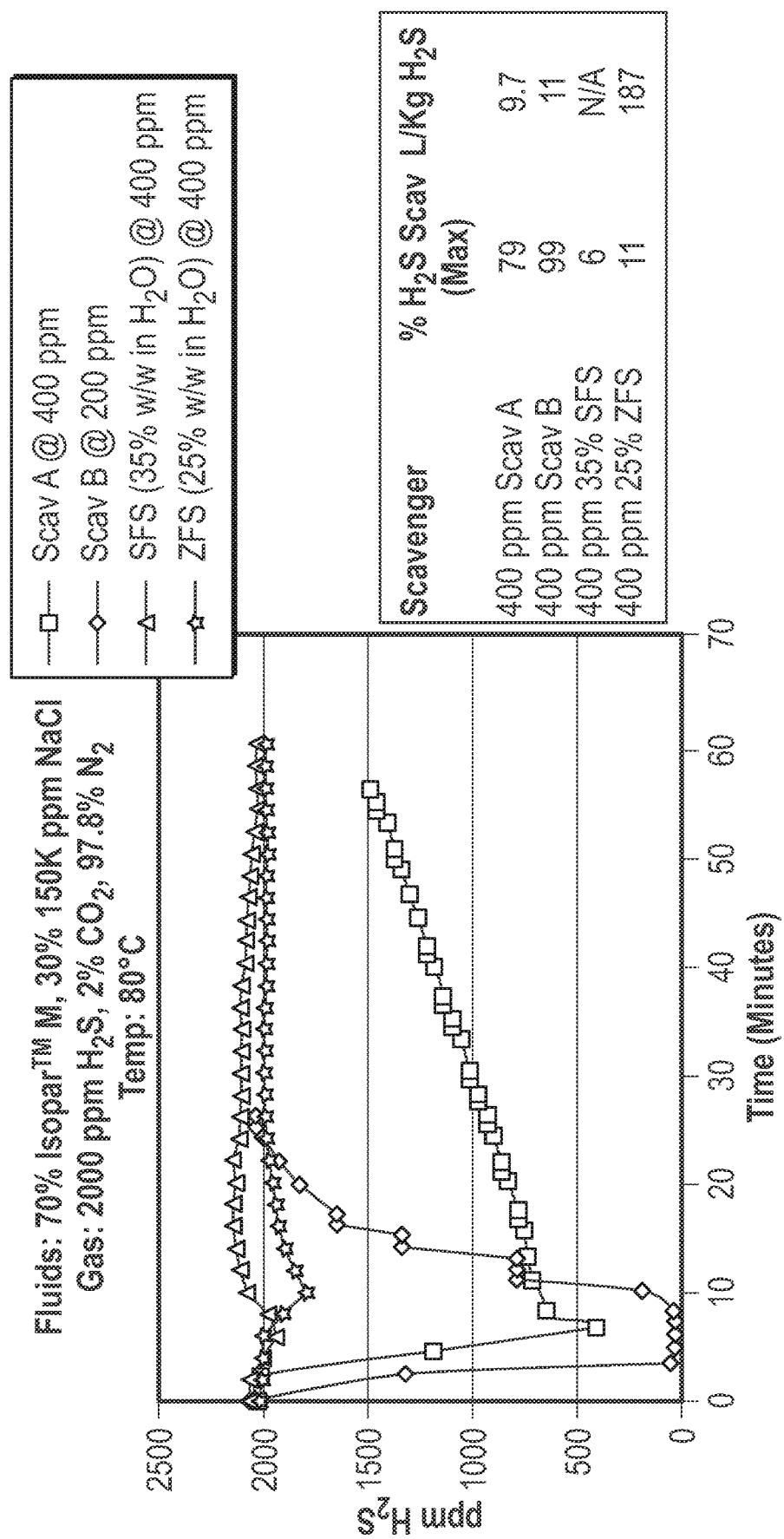
FIG. 2 is a graph demonstrating the change in $H_2S$ concentration vs. time with the injection of 400 ppm conventional Scavenger A, 200 ppm conventional Scavenger B, 400 ppm SFS, and 400 ppm ZFS in a simulated mixed production system at 80° C.

Results for SFS and ZFS in the Continuous Gas Flow test are presented in FIG. 1 (Examples 1-4) and FIG. 2 (Examples 5-8), and will be discussed first. The ppm reported for SFS are for a 35% w/w solution in water for all tests. The ppm reported for ZFS are for a 25% w/w solution in all tests. This test is a kinetic test, consequently slower reacting scavengers perform more poorly in this this test. Neither SFS nor ZFS showed good performance in the Continuous Gas Flow test so these do not appear to show promise for applications in very short residence time mixed production systems. In other words, these results are not impressive for either the SFS or ZFS since the scavenging rate of scavengers is slow in mixed oil/water fluids. The comparisons tested were commercial Scavenger A and commercial Scavenger B. The Scavenger A is very effective in mixed production applications and is particularly beneficial for use in these systems where there is a short residence time.

The performance of SFS and ZFS was measured in the modified ASTM D5705 procedure in four test fluids: oil (ISOPAR™ M), mixed phase (70% ISOPAR M+30% brine) and 100% brine @ pH 4.2 and at pH 2.4. Each brine phase contains 150,000 ppm NaCl and is saturated with $CO_2$. For brine at a pH 4.2, the brine is buffered with a 200 mM acetate buffer. For the tests with brine at a pH of 2.4, the brine is buffered with a 200 mM citrate buffer. The benchmarks which the SFS and ZFS were compared to were commercial Scavenger A and commercial Scavenger C. Testing was performed with two residence (reaction) times, 4 hr and 24 hr. Results are presented in Table I below.

TABLE I

Modified ASTM D5705 Test Results Temperature = 120° F. (49° C.); Agitation = 60 rpm continuous (orbital)

| Ex | Scavenger | Base-line | 4 Hr. ppm $H_2S$ | 4 Hr. % $H_2S$ Scavenged | 24 Hr. ppm $H_2S$ | 24 Hr. % $H_2S$ Scavenged |
|---|---|---|---|---|---|---|
| ISOPAR M | | | | | | |
| 9 | 500 ppm SCAV. A | 5000 | 2000 | 60 | 150 | 97 |
| 10 | 500 ppm SFS | 5000 | 4500 | 10 | 5000 | 0 |
| 11 | 1000 ppm SFS | 5000 | 4000 | 20 | 5000 | 0 |
| 12 | 500 ppm ZFS | 5000 | 4000 | 20 | 2500 | 50 |
| 13 | 1000 ppm ZFS | 5000 | 3000 | 40 | 2000 | 60 |
| 14 | 500 ppm SCAV. C | 5000 | | | 550 | 89 |
| 15 | 600 ppm SCAV. C | 6000 | 2500 | 58 | | |
| 16 | 1000 ppm SCAV. C | 5000 | | | 250 | 95 |
| 17 | 1200 ppm SCAV. C | 6000 | 2000 | 67 | | |
| 70% ISOPAR M/30% BRINE (pH 4.2) | | | | | | |
| 18 | 400 ppm SCAV. A | 4000 | 2500 | 38 | | |
| 19 | 800 ppm SCAV. A | 3000 | 1200 | 60 | | |
| 20 | 500 ppm SCAV. A | 5000 | | | 650 | 87 |
| 21 | 400 ppm SFS | 4000 | 4000 | 0 | | |
| 22 | 800 ppm SFS | 4000 | 3000 | 25 | | |
| 23 | 500 ppm SFS | 5000 | | | 3500 | 30 |
| 24 | 1000 ppm SFS | 5000 | | | 2500 | 50 |
| 25 | 400 ppm ZFS | 4000 | 2000 | 50 | | |
| 26 | 800 ppm ZFS | 4000 | 1000 | 75 | | |
| 27 | 500 ppm ZFS | 5000 | | | 2000 | 60 |
| 28 | 1000 ppm ZFS | 5000 | | | 500 | 90 |
| 29 | 500 ppm SCAV. C | 5000 | 3500 | 30 | | |
| 30 | 1000 ppm SCAV. C | 5000 | 2000 | 60 | | |
| BRINE (pH 4.2) | | | | | | |
| 31 | 400 ppm SCAV. A | 5000 | 850 | 83 | | |
| 32 | 800 ppm SCAV. A | 5000 | 400 | 92 | | |
| 33 | 400 ppm SCAV. A | 4000 | | | 150 | 96 |
| 34 | 800 ppm SCAV. A | 4000 | | | 50 | 99 |
| 35 | 400 ppm SFS (35% solution) | 5000 | >2500 | <56 | | |
| 36 | 800 ppm SFS (35% solution) | 5000 | 2050 | 59 | | |
| 37 | 400 ppm SFS (35% solution) | 4000 | | | 525 | 87 |
| 38 | 800 ppm SFS (35% solution) | 4000 | | | 30 | 99 |
| 39 | 400 ppm ZFS (25% solution) | 5000 | 1250 | 75 | | |
| 40 | 800 ppm ZFS (25% solution) | 5000 | 50 | 99 | | |
| 41 | 400 ppm ZFS (25% solution) | 4000 | | | 30 | 99 |
| 42 | 800 ppm ZFS (25% solution) | 4000 | | | 5 | 100 |
| 43 | 400 ppm SCAV. C | 5000 | 750 | 85 | | |
| 44 | 800 ppm SCAV. C | 5000 | 325 | 94 | | |
| 45 | 400 ppm SCAV. C | 4000 | | | 10 | 100 |
| 46 | 800 ppm SCAV. C | 4000 | | | 20 | 100 |
| BRINE (pH 2.4) | | | | | | |
| 47 | 400 ppm SCAV. A | 4500 | | | 1075 | 76 |
| 48 | 800 ppm SCAV. A | 4500 | | | 150 | 97 |
| 49 | 400 ppm SFS (35% solution) | 4500 | | | 1850 | 59 |
| 50 | 800 ppm SFS (35% solution) | 4500 | | | 500 | 89 |
| 51 | 400 ppm ZFS (25% solution) | 4500 | | | 1800 | 60 |
| 52 | 800 ppm ZFS (25% solution) | 4500 | | | 450 | 90 |
| 53 | 400 ppm SCAV. C | 4500 | | | 450 | 90 |
| 54 | 800 ppm SCAV. C | 4500 | | | 275 | 94 |

Neither the SFS nor the ZFS performed well in ISOPAR M alone, so these would appear to not be promising for oil-only applications. SFS does not appear to have released formaldehyde in these tests. While the ZFS did scavenge $H_2S$, most of the scavenging was likely due to the presence of zinc reacting with the $H_2S$ rather than formaldehyde release and the degree of scavenging was much lower than the comparisons. In tests with 70% ISOPAR M and 30% brine (simulating mixed production), both the SFS and ZFS showed scavenging performance with both showing much better results after 24 hours than 4 hours indicating that these react slowly with $H_2S$. These results indicate potential for the SFS and ZFS for a mixed fluid pipeline where there a long residence time available but not for short residence time systems such as injection into a mixed production flowline upstream of a separator. Overall, the sulfoxylates performed much better in brine than in the mixed phase or oil. The SFS reacts slower than glyoxal or triazine but was quite effective at scavenging $H_2S$ after 24 hours. The ZFS shows greater reactivity in the shorter time (4 hr) compared to SFS.

The scavengers of the compositions and methods described herein have been shown to be effective in brine or mixed production systems. The use of a formaldehyde sulfoxylate to scavenge $H_2S$ appears to be novel and not apparent from the known literature. The data do show that both the SFS and ZFS scavenge $H_2S$ effectively under certain circumstances. The SFS and ZFS may have certain advantages over known $H_2S$ scavenging alternatives such as triazine and glyoxal. Unlike triazine, SFS does not contain an amine which can be an issue both from a scaling and HSE perspective. The Hazardous Materials Identification System (HMIS) ratings of SFS in its solid form are 1-1-0. Glyoxal is very acidic (pH 2-3.5) and is very corrosive to carbon steel. Neither SFS nor ZFS solutions are expected to be corrosive to mild steel. Scavenger B can cause emulsification issues in some mixed production applications due to its surfactant properties, and it has the disadvantage that it may form solids. SFS does not appear to form solids based on testing so far. ZFS can form solids (zinc sulfide) but it is not expected to be surface active In the foregoing specification, the invention has been described with reference to specific embodiments thereof. The formaldehyde sulfoxylate scavengers of this method would be expected to be useful in other systems, i.e. particularly those containing water, besides those explicitly mentioned. It will be evident that various modifications and changes can be made to the methods and compositions described herein without departing from the broader invention as set forth in the appended claims. Accordingly, the specification is to be regarded in an illustrative rather than a restrictive sense. For example, specific formaldehyde sulfoxylate scavengers, proportions thereof, mixed production systems, brine systems, and contaminants falling within the claimed parameters, but not specifically identified or tried in particular compositions, are anticipated and expected to be within the scope of this invention.

The present invention may suitably comprise, consist or consist essentially of the elements disclosed and may be practiced in the absence of an element not disclosed. For instance, there may be provided a method for at least partially scavenging hydrogen sulfide ($H_2S$) from a system containing it, the system selected from the group consisting of mixed production and water or brine, where the method consists essentially of or consists of contacting the system with a scavenger comprising, consisting essentially of, or consisting of a formaldehyde sulfoxylate in an effective amount to at least partially scavenge $H_2S$ from the system, and at least partially scavenging the $H_2S$ from the system.

Further, there may be provided a system treated for hydrogen sulfide ($H_2S$) where the system comprises $H_2S$ and is selected from the group consisting of mixed production and water or brine, and where the system consists essentially of or consists of the mixed production and/or the water or brine and a scavenger comprising, consisting essentially of, or consisting of formaldehyde sulfoxylate in an effective amount to at least partially scavenge $H_2S$ from the system.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the singular forms "a," "an," and "the" are intended to include the plural forms as well, unless the context clearly indicates otherwise. As used herein, the term "and/or" includes any and all combinations of one or more of the associated listed items.

As used herein, relational terms, such as "first," "second," "top," "bottom," "upper," "lower," "over," "under," etc., are used for clarity and convenience in understanding the disclosure and accompanying drawings and do not connote or depend on any specific preference, orientation, or order, except where the context clearly indicates otherwise.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

What is claimed is:

1. A system treated for hydrogen sulfide ($H_2S$) where:
   the system is selected from the group comprising mixed production and water, which system comprises $H_2S$; and
   the system comprises a scavenger consisting of water as a solvent and a formaldehyde sulfoxylate in an effective amount to at least partially scavenge $H_2S$ from the system.

2. The system of claim 1 where the effective amount of the formaldehyde sulfoxylate scavenger ranges from about 2.5 kg/kg $H_2S$ to about 20 kg/kg $H_2S$ in the system.

3. The system of claim 1 where the formaldehyde sulfoxylate is selected from the group consisting of sodium formaldehyde sulfoxylate, zinc formaldehyde sulfoxylate, calcium formaldehyde sulfoxylate, potassium formaldehyde sulfoxylate, magnesium formaldehyde sulfoxylate, iron formaldehyde sulfoxylate, copper formaldehyde sulfoxylate, alkene aldehyde sulfoxylates, and combinations thereof.

4. The system of claim 1 where the system is a mixed production system consisting of oil, a hydrocarbon gas and at least 50 wt % water.

5. The system of claim 1 where the system is at a temperature range between about 0° C. to about 149° C.

6. The system of claim 1 where the system is present in an application selected from the group consisting of oil wells, gas wells, mixed phase pipelines, transport of sour water for disposal, frac-water systems, acid flow back wells, sour water strippers, and wastewater systems.

7. A system treated for hydrogen sulfide ($H_2S$) where:
   the system is selected from the group comprising mixed production and water, which system comprises $H_2S$; and
   the system comprises a scavenger consisting of water as a solvent and a formaldehyde sulfoxylate in an amount ranging from about 2.5 kg/kg $H_2S$ to about 20 kg/kg $H_2S$ in the system to at least partially scavenge $H_2S$ from the system, where the formaldehyde sulfoxylate is selected from the group consisting of sodium formaldehyde sulfoxylate, zinc formaldehyde sulfoxylate, calcium formaldehyde sulfoxylate, potassium formaldehyde sulfoxylate, magnesium formaldehyde sulfoxylate, iron formaldehyde sulfoxylate, copper formaldehyde sulfoxylate, alkene aldehyde sulfoxylates, and combinations thereof.

8. The system of claim 7 where the system is a mixed production system consisting of oil, a hydrocarbon gas and at least 50 wt % water.

9. The system of claim 7 where the system is at a temperature range between about 0° C. to about 149° C.

10. The system of claim 7 where the system is present in an application selected from the group consisting of oil wells, gas wells, mixed phase pipelines, transport of sour water for disposal, frac-water systems, acid flow back wells, sour water strippers, and wastewater systems.

11. A system treated for hydrogen sulfide ($H_2S$) where:
    the system is mixed production, which system consists of $H_2S$, oil, a hydrocarbon gas and at least 50 wt % water, and the system is at a temperature range between about 0° C. to about 149° C.; and
    the system comprises a scavenger consisting of water as a solvent and a formaldehyde sulfoxylate in an effective amount to at least partially scavenge $H_2S$ from the system.

12. The system of claim 11 where the effective amount of the formaldehyde sulfoxylate scavenger ranges from about 2.5 kg/kg $H_2S$ to about 20 kg/kg $H_2S$ in the system.

13. The system of claim 11 where the formaldehyde sulfoxylate is selected from the group consisting of sodium formaldehyde sulfoxylate, zinc formaldehyde sulfoxylate, calcium formaldehyde sulfoxylate, potassium formaldehyde sulfoxylate, magnesium formaldehyde sulfoxylate, iron formaldehyde sulfoxylate, copper formaldehyde sulfoxylate, alkene aldehyde sulfoxylates, and combinations thereof.

14. The system of claim 11 where the system is present in an application selected from the group consisting of oil wells, gas wells, mixed phase pipelines, transport of sour water for disposal, frac-water systems, acid flow back wells, sour water strippers, and wastewater systems.

* * * * *